Patented Jan. 21, 1930

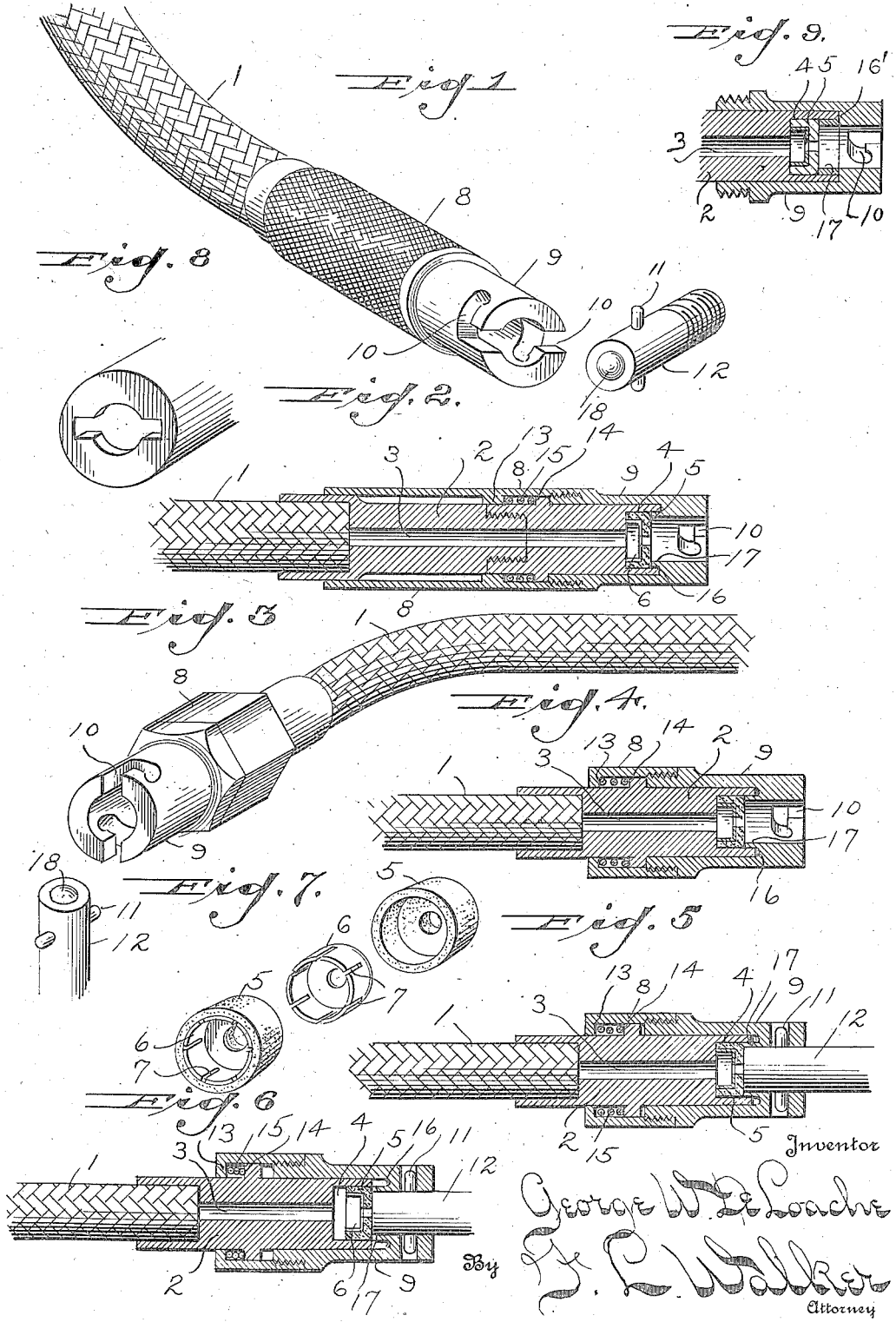

1,744,367

UNITED STATES PATENT OFFICE

GEORGE W. DE LOACHE, OF DAYTON, OHIO, ASSIGNOR, BY MESNE ASSIGNMENTS, TO THE R. M. HOLLINGSHEAD COMPANY, A CORPORATION OF NEW JERSEY

QUICK-DETACHABLE COUPLING

Application filed June 18, 1926, Serial No. 116,823. Renewed June 21, 1929.

My invention relates to quick detachable couplings and more particularly to a high pressure coupling having improved leak-proof sealing means.

The present coupling is particularly adapted to high pressure conduits for supplying compressed air, steam, water or other fluid under pressure, but is especially designed for use in connection with high pressure lubricating apparatus for detachably connecting a compressor or grease gun with a lubricant nipple or receptacle upon a machine bearing or the like.

In the present construction there is contemplated a nozzle member fixedly connected to a supply conduit or hose so that the nozzle and hose become in effect a unitary structure for unison movement. Telescopically enclosing the nozzle is a spring actuated coupling sleeve having at its outer or free end a bayonet slot or the like for engagement with a studded nipple or receiver. The helical spring enclosed within the telescopic sleeve and surrounding the nozzle which bears at one end upon an abutment shoulder upon the nozzle and at its opposite end upon an abutment shoulder upon the telescopic sleeve tends to thrust the nozzle forwardly or to retract the sleeve relative to the nozzle. Located within a counter bore in the forward end of the nozzle is a sliding sealing gasket comprising a cup leather having therein a metal reinforcement cup, which prevents the collapse of the cup leather under pressure and serves to hold the side walls distended against the interior of the counter-bore. The telescopic sleeve is provided with an internal shoulder which overhangs the end of the nozzle and limits the outward movement of the cup leather or gasket. This shoulder within the telescopic sleeve is recessed or grooved to provide a rearwardly projecting flange which extends within the end of the nozzle, as the nozzle is projected forwardly, thus serving to push the gasket or cup-leather rearwardly within the nozzle as the telescopic sleeve is retracted under the influence of the spring. Upon the initial coupling of the nipple or receiver within the sleeve, the nozzle is pushed rearwardly against the tension of the spring so that the gasket or cup leather is held against the end of the nipple to afford a preliminary or initial sealing pressure under the influence of the spring. The interior of the cup leather or gasket is subject to fluid pressure of the high pressure fluid passing through the coupling by which this sealing pressure is augmented. The reaction of the fluid pressure behind the gasket or cup leather tends to further force the nozzle rearwardly against the tension of the spring, thereby compressing the spring in opposition to the fluid pressure.

In its general construction, the present coupling is fundamentally that disclosed in expired patent to Stedman 456,295 of July 21, 1891, to which has been added the improved form of leak-proof fluid pressure operated sealing means before described. While it is more or less common to provide a reciprocatory sealing gasket in the coupling head or nozzle, such gasket is usually subjected to direct action of a spring which serves to project the sealing gasket outwardly upon disconnection of the parts, and wherein the internal fluid pressure acts in unison with the tension or expansion of the spring, of which construction a characteristic example is that shown in expired patent to Coleman 864,079 of August 20, 1907. The present construction differs characteristically from such typical spring pressed sealing gasket construction in the fact that in the present case expansion or tension of the spring tends to effect the retraction of the gasket upon disconnection of the parts, and the fluid under pressure operates in opposition to the tension of the spring tending to place the spring under compression, while the parts are operatively connected.

The object of the invention is to improve the prior art structure, whereby it will not only be cheapened in construction, and facilitate the manufacture, but will be more efficient in use, positive in operation, effective in affording a leak-tight joint, and unlikely to get out of repair.

A further object of the invention is to provide an improved form of reinforced sealing gasket, and improved means for controlling the movement of such gasket relative to the nozzle.

With the above primary and other incidental objects in view as will more fully appear in the specification, the invention consists of the features of construction, the parts and combinations thereof, and the mode of operation or their equivalents as hereinafter described and set forth in the claims.

Referring to the accompanying drawings, wherein is shown the preferred, but obviously, not necessarily the only form of embodiment of the invention, Fig. 1 is a perspective view of the assembled coupling and the nipple or receiver, with which it is to be engaged. Fig. 2 is a longitudinal sectional view of the coupling head shown in Fig. 1. Fig. 3 is a perspective view of a modified form of the coupler embodying the same structural features as that of Fig. 1, but in a shortened or more condensed form. Fig. 4 is a longitudinal sectional view of the coupler shown in Fig. 3, with the parts in their normal position when the coupler is disconnected. Fig. 5 is a similar sectional view showing the head initially connected with the nipple or fitting. Fig. 6 is a similar sectional view of the parts when delivering fluid therethru under high pressure. Fig. 7 is a detail perspective view of the sealing gasket or cup leather and its reinforcement insert both separated and assembled. Fig. 8 is a detail perspective end view of the coupler head showing the use of a key-hole slot in lieu of the bayonet slot for engagement with the threaded nipple or fitting. Fig. 9 is detail view of a modification of the construction shown in the preceding figures in which the manufacturing cost is reduced by making the reseating flange for the gasket as a separate ring in lieu of an integral part of the coupling sleeve.

Like parts are indicated by similar characters of reference throughout the several views.

In the accompanying drawings, 1 indicates the conduit or hose to the end of which is fixedly connected the nozzle member 2. For heavy duty service, the hose 1 is preferably of the woven metal type, although obviously, any suitable character or type of conduit may be employed. The nozzle 2 is securely attached by soldering, welding, crimping, or by any other suitable means. The nozzle 2 is provided with the longitudinal bore 3, communicating with that of the hose 1, and at its extremity the nozzle is counterbored or recessed at 4, to receive a sealing gasket. While the gasket may be merely a perforated disc, capable of limited to and fro axial movement within the counter-bore 4 of the nozzle, there is preferably provided a perforated cup leather 5, having therein a reinforcement metal cup 6, the walls of which are slotted at 7 to form a peripherally arranged series of tongues. This cup 6 fits snugly within the cup leather gasket 5, and when the gasket is retracted within the counter-bore 4, the reinforcement cup 6 bears against the shoulder of the counter-bore, resisting pressure upon the gasket and preventing its collapse. At the same time, this metallic reinforcement cup keeps the side walls of the cup leather gasket distended and in contact with the interior walls of the counter-bore 4, while the longitudinal slots 7 admit the fluid pressure direct to the walls of the cup leather gasket, thereby serving to forcibly expand the walls of the cup leather under influence of fluid pressure into tight leak-proof engagement with the interior walls of the counterbored extremity of the nozzle 2. Slidingly mounted exteriorly of the nozzle 2 is a telescopic coupling sleeve, which in order to facilitate assembly is preferably formed in separable parts 8 and 9, screw threaded one into the other. The extremity 9 of the telescopic coupling sleeve is provided with bayonet slots 10, for the engagement of outstanding studs 11, of the nipple or complementary fitting 12. Within the sleeve portion 8 is an abutment shoulder 13, while the nozzle portion 2 is provided with a co-acting peripheral abutment shoulder 14, located forwardly of the internal shoulder 13 of the telescopic sleeve. Surrounding the nozzle portion 2 and enclosed within the telescopic coupling sleeve is a helical spring 15, abutting at one end upon the internal shoulder 13 of the sleeve, and at its opposite end upon the external peripheral shoulder 14, of the nozzle. This spring 15 by its expansive tendency draws the external coupling sleeve 8—9 rearwardly or conversely projects the nozzle 2 forwardly within the coupling sleeve. Adjacent to its forward stud engaging portion, the telescopic coupling sleeve portion 9 is provided with an internal flanged shoulder or seat. This shoulder or seat 16 is recessed or grooved to receive the forward end of the nozzle 2, while the interior rearwardly projecting flange or margin 17 of the recessed seat or shoulder 16, projects interiorly of the counter-bore 4 of the nozzle, and as the nozzle is thrust forwardly under the influence of the spring 15, such flange or projecting margin 17 engages the sealing gasket 5 thrusting the sealing gasket rearwardly or retracting it within the counter-bore 4. This projecting flange or margin 17 of the shoulder or seat 16 may be said to form a limiting stop for the gasket 5, as the nozzle moves forwardly, while the nozzle is permitted a further limited movement subsequent to the arrest of the sealing gasket 5 until the end of the nozzle is seated in the groove or recess of the shoulder 16, or until the peripheral shoulder 14 of the nozzle engages the rear end of the coupling sleeve portion 9. The inwardly projecting flange or rim of the recessed seat 16, not only prevents the displacement of the sealing gasket 5 from the counter-bore 4 of the nozzle, but it also has the further function of returning or retracting the sealing gasket to its innermost position within the counter-bore 4, as the nozzle is projected forwardly by the spring 15 upon disengagement of the coupling sleeve from the studded nipple or fitting 12 comprising the complementary member of the coupling. Such normal position of the sealing gasket or cup leather in its retracted or innermost position is shown in Figs. 2 and 4. Upon the initial interengagement of the coupling sleeve with the complementary member or fitting 12, the end of the fitting 12, which in the drawing has been shown provided with a spring pressed closure valve 18, abuts upon the sealing gasket 5. The complementary member or fitting 12 is of such length that in order to enable the outstanding studs to engage in the bayonet slot 10 of the coupling sleeve, the nozzle 2 is pressed slightly inwardly from its engagement upon the seat 16, against the tension of the spring 15. The metallic reinforcement cup provided interiorly of the cup leather gasket 5 receives and transmits this thrust to the nozzle 2 thus preventing collapse of the gasket. The spring 15 tending to thrust the nozzle forwardly holds the sealing gasket 5 tightly against the end of the complementary coupling member or fitting 12, thus providing an initial or preliminary sealing pressure. However, as fluid under pressure is discharged through the conduit 1, and thence through the bore 3 of the nozzle, the interior of the sealing gasket 5 is subjected to such fluid pressure which not only extends the side walls of the cup leather tightly against the interior of the counter-bore 4, but also materially increases the sealing pressure of the gasket upon the end of the fitting or complementary member 12. At the same time the reaction of this internal pressure within the counter-bore 4 presses the nozzle 2 rearwardly against the tension of the spring 15 as shown in Fig. 6. While the sealing gasket 5 is held stationarily against the end of the nipple or seat 12, the nozzle moves rearwardly relative to said gasket, until the sealing gasket assumes a position at the forward extremity of the counter-bored chamber 4 of the nozzle and in spaced relation with the offset or shoulder thereof, as indicated in Fig. 6. Thus the internal fluid pressure operates in opposition to the spring 15, placing the spring under compression, whereas the spring 15 by its expansive tendency tends to move the nozzle 2 forwardly, the internal fluid pressure within the counter-bored chamber 4 overcoming the tension of the spring 15 moves such nozzle rearwardly, while at the same time forcing the sealing gasket 5 against the end of the nipple or complementary coupling member with increased pressure. Upon the disengagement of the studded nipple 12, from the coupling sleeve, and consequent release of internal pressure within the counter-bore 4, the spring 15 effects the retraction or return of the gasket 5 within the counter-bored chamber 4 to its innermost position as shown in Figs. 2 and 4.

While a simple and conventional form of bayonet connection has been shown and described, it will be obvious that any other suitable form of connector may be substituted therefor, as for instance, a claw type of connector as shown in patent to Donnelly 976,787 of November 22, 1910, or a simple form of screw threaded connection as shown in Rohrbacher 928,797 July 20, 1907. In Fig. 8 there is shown a detail end elevation of the coupling sleeve disclosing a key-hole slot for interconnection with the studded nipple or fitting 12, in lieu of the bayonet slot otherwise shown and described.

Inasmuch as the recessing of the shoulder 16 to form the flange 17 involves an expensive manufacturing operation, there is shown in Fig. 9 a modification wherein the manufacturing operation is simplified and production costs reduced. In such construction in lieu of recessing the seat 16 to afford the inwardly projecting flange 17, a square shoulder 16' is formed within the sleeve portion 9 and an independently formed ring 17' of such diameter as to enter the counterbore 4 is seated upon the shoulder 16'. This ring performs all the functions of the flange 17, it is held to the shoulder 16 at all times by the pressure of the sealing member 5.

To facilitate the assembly of the construction shown in Figs. 1 and 2, the nozzle member 2 (Fig. 2) has been shown formed in two separable parts screw threaded one into the other.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprises the preferred form of several modes of putting the invention into effect and the invention is, therefore, claimed in any of its forms or modifications within the legitimate and valid scope of the appended claims.

Having thus described my invention, I claim:

1. In a coupling of the character described, a conduit, a nozzle member fixedly connected thereto, a member to which the nozzle is to be detachably connected, interlocking means carried by the nozzle for engagement with the second member, a sealing gasket, a spring acting to retract the gasket relative to the nozzle when disconnected from the second member, said spring tending to press the gasket into initial sealing engagement with the second member upon interconnection of the nozzle therewith, said gasket being subject to fluid pressure by which the initial sealing pressure is augmented during discharge of fluid under pressure therethrough, such fluid pressure being exerted in opposition to the tension of the spring which is thereby compressed.

2. The combination with two members to be detachably connected, of interengaging coupling means, a sealing gasket slidingly adjustable upon one of the members, a spring effecting the retraction of the sliding gasket when said members are disconnected, said spring pressing said gasket upon the second member upon the interconnection of said members, said gasket being subjected to fluid pressure, of fluid being discharged through the coupling, said fluid pressure being exerted in opposition to the tension of the spring which is thereby placed under increased tension.

3. The combination with a studded nipple member, a conduit, a nozzle member fixedly connected to the conduit as a unitary structure, a telescopic spring actuated sleeve carried by the nozzle member having a bayonet slot or the like therein for engagement with the studded nipple member, of a reciprocatory sealing gasket carried by the nozzle, said gasket being subjected to fluid pressure during the passage of fluid under pressure through the coupling by which the gasket is pressed into sealing contact with the nipple member, and means for effecting the retraction of the gasket inwardly relative to the nozzle upon disengagement of the nozzle and nipple.

4. The combination with a studded nipple member, a conduit, a nozzle member fixedly connected to the conduit as a unitary structure, a telescopic spring actuated sleeve carried by the nozzle member having a bayonet slot or the like therein for engagement with the studded nipple member, of a reciprocatory sealing gasket carried by the nozzle member, a seat within the telescopic sleeve limiting the relative movement of the sleeve and gasket, while permitting a limited further relative adjustment of the nozzle and sleeve in the same direction.

5. The combination with a studded nipple member, a conduit, a nozzle member fixedly connected to the conduit as a unitary structure, a telescopic spring actuated sleeve carried by the nozzle member having a bayonet slot or the like therein for engagement with the studded nipple member, of a reciprocatory sealing gasket, stop shoulders upon the sleeve and nozzle respectively limiting the relative movement of the gasket in opposite directions, the retractive movement of the nozzle and spring actuated sleeve serving to retract the gasket upon disconnection from the nipple, the gasket being subjected to fluid pressure of the fluid passing through the coupling while connected by which the gasket is relatively moved in the opposite direction.

6. In a coupling device of the character described, a member to be coupled, a nozzle member for engagement therewith, having a counterbored recess at its end, a gasket slidingly adjustable within the counterbore, a telescopic sleeve arranged exteriorly relative to the nozzle, an inwardly projecting flange within the sleeve extending into the open end of the counter-bore of the nozzle and engaging the gasket therein, to push the gasket rearwardly within the counterbore as the sleeve and nozzle are telescopically adjusted.

7. In a coupling of the character described, a pair of complementary members to be interconnected, interengaging coupling means therefor, one of the members having a bore therein, a cup shaped gasket slidingly mounted in said bore and adapted to be projected against the end of the other member to effect a sealed contact, spring means for effecting the initial sealing pressure of the gasket upon the complementary member and fluid pressure means subsequently pressing the gasket upon the opposing member in opposition to the spring pressure.

8. In a coupling of the character described, a pair of complementary members to be interconnected, interengaging coupling means therefor, a sealing gasket movably mounted in one of said members, a spring initially pressing the gasket against the opposite member, when said members are interconnected, said spring operating subsequent to the disconnection of the members to effect the return of the gasket in the direction opposite to said initial pressure relative to the first member.

9. In a coupling device of the character described, the combination with two members to be interconnected of a coupling sleeve telescopically carried by one member and engageable with the other member, the first member being counterbored to receive a gasket, a sealing gasket movably located therein, an internal circumferential shoulder within the coupling sleeve overhanging the end of the first member and an annular stop projecting axially from said shoulder within the counterbore of said member into engagement with the gasket, said stop and counterbored member being relatively adjustable in an axial direction.

10. In a coupling member for detachable sealed engagement with a complementary coupling member, including a coupling sleeve having means for engagement with the second coupling member, a spring actuated plunger within the coupling sleeve, and a sealing gasket carried by the spring actuated plunger for reciprocatory movement independent of the spring and initially seated against the second member by the pressure of the plunger under the influence of its spring, and fluid pressure means for placing the spring under increased compression.

11. In a coupling member for detachable engagement with a complementary member, a coupling sleeve having means for engagement with the second member, a reciprocatory tubular plunger mounted within the sleeve a conduit connected with said tubular plunger, a spring tending to retract the sleeve upon the plunger and conversely project the plunger toward the engaging end of the sleeve, and a sealing gasket carried by the plunger for axial movement relative thereto, and initially seated upon the complementary member by the influence of said spring said gasket being subjected to fluid pressure of a commodity being discharged through the coupling by which the gasket is urged toward its seat, the action of said fluid pressure against the plunger serving to place said spring under increased compression.

12. In a coupling member for detachable connection with a complementary member, a coupling sleeve, a spring pressed sealing gasket therein, a spring for effecting the initial seating of the gasket upon the complementary engaged member, said gasket being subject to fluid pressure of a commodity being discharged through the coupling, and means whereby the reaction of the fluid pressure of the discharged commodity will place said spring under increased compression.

In testimony whereof, I have hereunto set my hand this 5th day of May A. D. 1926.

GEORGE W. DE LOACHE.